US008257046B2

(12) United States Patent
Saito et al.

(10) Patent No.: US 8,257,046 B2

(45) Date of Patent: Sep. 4, 2012

(54) TURBINE ROTOR BLADE, TURBINE ROTOR AND STEAM TURBINE EQUIPPED WITH THE SAME

(75) Inventors: Kazuhiro Saito, Kanagawa-Ken (JP); Itaru Murakami, Tokyo (JP); Kenichi Okuno, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1022 days.

(21) Appl. No.: 12/095,462

(22) PCT Filed: Nov. 28, 2006

(86) PCT No.: PCT/JP2006/323713

§ 371 (c)(1), (2), (4) Date: Jul. 16, 2008

(87) PCT Pub. No.: WO2007/063848

PCT Pub. Date: Jun. 7, 2007

(65) Prior Publication Data

US 2009/0246029 A1 Oct. 1, 2009

(30) Foreign Application Priority Data

Dec. 1, 2005 (JP) ................................ P2005-348161

(51) Int. Cl.

| | |
|---|---|
| ***B64C 11/04*** | (2006.01) |
| ***F03B 3/12*** | (2006.01) |
| ***F04D 29/34*** | (2006.01) |

(52) U.S. Cl. ...................... 416/215; 416/223 R; 415/115

(58) Field of Classification Search .................. 416/215, 416/223 R; 415/115

See application file for complete search history.

(56) References Cited

U.S. PATENT DOCUMENTS

| | | | | |
|---|---|---|---|---|
| 5,509,784 | A | 4/1996 | Caruso et al. | |
| 6,158,104 | A | 12/2000 | Roberts et al. | |
| 6,416,286 | B1 | 7/2002 | Roberts et al. | |
| 6,827,554 | B2 | 12/2004 | Caruso et al. | |
| 6,830,435 | B2 * | 12/2004 | Goetzfried et al. | 416/189 |
| 2004/0120817 | A1 | 6/2004 | Shapiro et al. | |
| 2006/0002798 | A1 | 1/2006 | Ooishi et al. | |
| 2006/0127221 | A1 | 6/2006 | Yamashita et al. | |

FOREIGN PATENT DOCUMENTS

| | | | |
|---|---|---|---|
| EP | 1 724 441 | A2 | 11/2006 |
| JP | 5-098906 | A | 4/1993 |
| JP | 6-117201 | A | 4/1994 |
| JP | 10-103003 | A | 4/1998 |
| JP | 11-210402 | A | 8/1999 |
| JP | 2004-052757 | A | 2/2004 |
| JP | 2004-257385 | A | 9/2004 |
| SE | 101 549 | C | 5/1941 |
| WO | WO 01/71165 | A1 | 9/2001 |
| WO | WO 2004/022923 | A1 | 3/2004 |

* cited by examiner

*Primary Examiner* — Toan Le

(74) *Attorney, Agent, or Firm* — Foley & Lardner LLP

(57) ABSTRACT

A turbine rotor blade according to the present invention includes a cover provided at the top of an effective blade portion and a blade-fitting portion provided at the bottom of the effective blade portion. A turbine wheel is provided with a turbine-wheel engagement portion to which the blade-fitting portion is fittable. The turbine rotor blade is a portion of a blade array structure formed by arranging the cover and a neighboring cover in contact with each other. The blade-fitting portion is provided with an anti-twist segment, and the turbine-wheel engagement portion is provided with an untwist restraining segment engageable to the anti-twist segment.

15 Claims, 10 Drawing Sheets

TURBINE ROTOR BLADE, TURBINE ROTOR AND STEAM TURBINE EQUIPPED WITH THE SAME

TECHNICAL FIELD

The present invention relates to a turbine rotor blade having a snubber cover (integral cover) formed by integrally cutting out a blade head (blade top portion) from an effective blade portion or by being integrally joined to an end of the effective blade portion using a metallurgical technique. The present invention also relates to a turbine rotor and a steam turbine equipped with such a turbine rotor blade and a turbine rotor.

BACKGROUND ART

A typical steam turbine has a turbine rotor extending horizontally within a turbine casing. The turbine rotor and the turbine casing have a steam channel therebetween. The steam channel is provided with a plurality of turbine stages. Each turbine stage is equipped with a stator blade (turbine nozzle) and a rotor blade (turbine bucket) fitted to the turbine rotor.

Regarding turbine rotor blades used in such a steam turbine, the blade heads often adopts a blade array structure in order to suppress vibration generated during operation or to prevent the steam from leaking through the blade heads.

A blade array structure is formed by joining a plurality of blades to one another to form a single unit. Specifically, these multiple blades are joined to one another by mounting covers onto tenons provided at the blade heads and then caulking the tenons.

In a blade array structure, multiple blades are joined to one another to form a unit, and a certain number of units are provided at the top of turbine rotor blades. However, in addition to time consuming due to a large amount of time required for the caulking process of tenons, such a blade array structure does not necessarily have enough strength at the joint sections. There is known another type of a blade array structure in which all of the blades are joined to one another with covers (integral covers) using a different technique. This type of a blade array structure is known as a full-circumference single-unit blade-array structure.

With regard to a full-circumference single-unit blade-array structure in which the blades are joined to one another with covers, there have provided many technologies which are based on studies on the optimal shape of the covers and the strength and positioning of the joints between the blades and the covers.

FIG. 16 shows an example of turbine rotor blades having a full-circumference single-unit blade-array structure in which an array of blades are joined to each other with covers. Specifically, covers 31, 31 are attached to the top of blades 30, 30. Each of the covers 31, 31 is equipped with bulging sections 34 and 35 that extend from a dorsal blade section 32 side and a ventral blade section 33 side in a circumferential direction 37 of a turbine rotor and in a direction opposite thereto, respectively. The bulging sections 34 and 35 of the neighboring blades 30, 30 are brought into tight contact with each other at their cover contact surfaces 38 extending crosswise to a cover-contact-surface normal line direction (axial direction of the turbine rotor) 36. Under the strong contact force, a reaction force is generated, which is used as a frictional force for suppressing vibration. In other words, a so-called snubber cover structure is disclosed, for example, in Patent Document 1 (Japanese Unexamined Patent Application Publication No. 10-103003).

With a snubber cover structure, a frictional force is produced between the cover contact surfaces 38 of the neighboring blades 30, 30, even if the wheel (i.e. a disk provided on the turbine rotor by integral cutting) undergoes thermal expansion in the radial direction thereof due to a centrifugal force generated during operation or there is an increase in the pitch of the covers 31, 31 caused by a difference in thermal expansion between the wheel and the covers 31. Thus, the positional relationship (face-to-face distance) between the covers 31, 31 is hardly affected by such thermal expansion or an increase in the pitch. Consequently, the positions of the turbine stages used are not subject to limitation even if there are variations in the blade length, there are temperature differences among various positions, or there are differences in linear expansion among the materials used. This allows the free selection of optional turbine stages.

Accordingly, such a snubber cover structure applicable to any of the positions of the turbine stages has been applied to more and more steam turbines in recent years as actual devices.

Although the snubber cover structure disclosed in the Patent Document 1 is advantageous in terms of having the ability to exhibit a high damping effect without having any limitations with respect to the variations in the blade length and the differences in thermal expansion among the materials used, the snubber cover structure still has some problems including a problem related to an assembly process.

Specifically, regarding turbine rotor blades having a snubber cover structure, an assembling process is performed by bringing the cover contact surfaces 38, which are defined by sides of the bulging sections 34 and 35 that are parallel to the circumferential direction 37 of the turbine rotor, into pressure contact with each other when the neighboring covers are brought into contact with each other. Therefore, the dimensions are preliminarily adjusted or the covers are intentionally deformed by means of caulking so as to allow the bulging sections 34 and 35 respectively at the dorsal blade section 32 side and the ventral blade section 33 side to cause interference therebetween.

In these processes performed with respect to turbine rotor blades of this type, the shoulders of the bulging sections 34 and 35 serving as the cover contact surfaces 38 are simply pressed tightly against each other, whereas other contact surfaces are not considered in terms of design. Therefore, even though the shoulders favorably become twisted as a result of reaction forces generated by tightly pressing the shoulders against each other, the twisting is cancelled by the centrifugal force produced during operation. Thus, the generated reaction forces weaken, resulting in the inability to utilize the frictional force, providing a problem of the damping effect being not maintained at a high level.

DISCLOSURE OF THE INVENTION

In view of the circumstances described above, it is an object of the present invention to provide a turbine rotor blade which can achieve a full-circumference single-unit blade structure, which can ensure that a contact reaction force is stably and reliably generated on a cover contact surface of a snubber structure, and which can reliably prevent the cover from being untwisted during operation.

It is another object of the present invention to provide a turbine rotor and a steam turbine equipped with this turbine rotor blade.

In order to achieve the aforementioned object, the present invention provides a turbine rotor blade that includes a cover provided at a blade head of an effective blade portion and a blade-fitting portion provided at a blade base of the effective blade portion, the blade-fitting portion being fitted to a turbine-wheel engagement portion provided in a turbine rotor via a solid portion, the turbine rotor blade being a portion of a blade unit structure formed by arranging the cover and a neighboring cover in contact with each other. The cover has a cover ventral-bulging section that bulges in a circumferential direction of the turbine rotor from one side of the cover located on a ventral blade side, and also has a cover dorsal-bulging section that bulges in the circumferential direction of the turbine rotor from another side of the cover located on a dorsal blade side, the bulging sections being positioned in a point symmetrical arrangement with each other as viewed from the blade head. A sum of a width of the cover ventral-bulging section in an axial direction of the turbine rotor and a width of the cover dorsal-bulging section in the axial direction of the turbine rotor is greater than a width of the cover in the axial direction of the turbine rotor. The solid portion is provided with an anti-twist segment projecting in the axial direction of the turbine rotor and extending in the circumferential direction of the turbine rotor.

In the turbine rotor blade according to the present invention, a deviation in parallelism between the anti-twist segment provided in the solid portion and a cover contact surface where the cover ventral-bulging section and the cover dorsal-bulging section are in contact with each other is set within a range of 1 degree or less.

In the turbine rotor blade according to the present invention, the blade-fitting portion is has a T-shaped structure.

The turbine rotor blade according to the present invention is applied to a turbine rotor integrally provided with a turbine wheel to which the aforementioned turbine rotor blade is fitted. A bottom section of the turbine-wheel engagement portion is provided with any one of an untwist restraining segment engageable to the aforementioned anti-twist segment, an untwist restraining groove engageable to the anti-twist segment, and an untwist restraining segment engageable to an untwist restraining groove.

A turbine rotor blade according to the present invention includes a cover provided at a blade head of an effective blade portion and an outside-dovetail-shaped blade-fitting portion provided at a blade base of the effective blade portion, the blade-fitting portion being fitted to a turbine-wheel engagement portion provided in a turbine rotor via a solid portion, the turbine rotor blade being a portion of a blade unit structure formed by arranging the cover and a neighboring cover in contact with each other. The cover has a cover ventral-bulging section that bulges in a circumferential direction of the turbine rotor from one side of the cover located on a ventral blade side, and also has a cover dorsal-bulging section that bulges in the circumferential direction of the turbine rotor from another side of the cover located on a dorsal blade side, the bulging sections being positioned in a point symmetrical arrangement with each other as viewed from the blade head. A sum of a width of the cover ventral-bulging section in an axial direction of the turbine rotor and a width of the cover dorsal-bulging section in the axial direction of the turbine rotor is greater than a width of the cover in the axial direction of the turbine rotor. The outside-dovetail-shaped blade-fitting portion has a leg segment whose end is provided with an anti-twist groove having a cutout shape and extending in the circumferential direction of the turbine rotor.

A steam turbine according to the present invention includes a combination of the aforementioned turbine rotor blade and turbine rotor.

In the turbine rotor blade and the steam turbine according to the present invention, the blade-fitting portion is provided with the anti-twist segment, and the turbine-wheel engagement portion is provided with the untwist restraining segment that is engageable to the anti-twist segment.

This configuration ensures that sufficient cover-contact reaction forces can be generated on the cover contact surfaces of the cover and a neighboring cover. Under the attainment of sufficient cover-contact reaction forces, a sufficient damping effect can be exhibited.

BEST MODES FOR CARRYING OUT THE INVENTION

Figure 1:
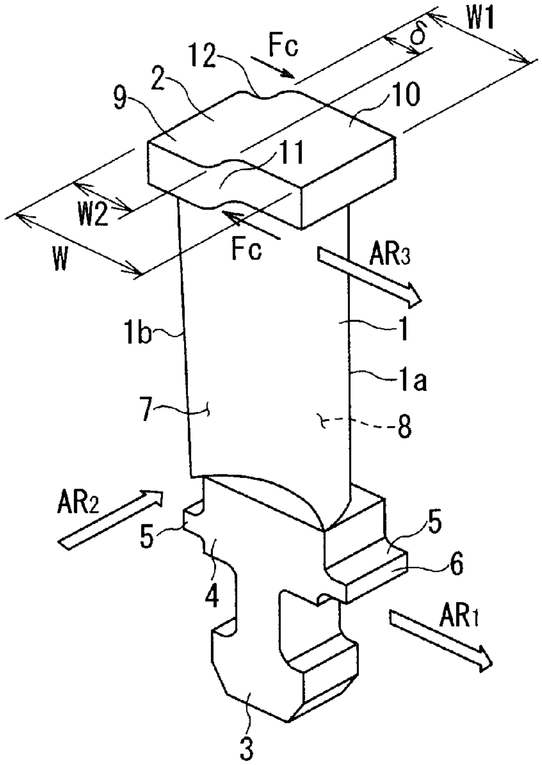
FIG. 1 is a perspective view of a turbine rotor blade according to a first embodiment of the present invention.

Embodiments of a turbine rotor blade, a turbine rotor, and a steam turbine equipped with them according to the present invention will now be described with reference to the accompanying drawings with the reference numerals.

FIG. 1 is a perspective view of a turbine rotor blade according to a first embodiment of the present invention.

The turbine rotor blade according to this embodiment is used in a steam turbine that serves as a power machine at a power station. The turbine rotor blade includes a cover 2 having a snubber structure and provided at the top of an effective blade portion 1 having a front edge 1*a* as a blade entrance section and a rear edge 1*b* as a blade exit section, and a T-shaped blade-fitting portion 3 provided at the bottom of the effective blade portion 1.

The effective blade portion 1, the cover 2 and the T-shaped blade-fitting portion 3 are formed by cutting out a single material or are metallurgically joined to one another.

The T-shaped blade-fitting portion 3 has a solid (blade base) 4 and anti-twist segments 5 projecting from the front edge 1*a* side and the rear edge 1*b* side of the solid 4 along an anti-twist-segment normal line (axial direction of a turbine rotor) $AR_1$ thereof.

Each projected anti-twist segment 5 extends in a circumferential direction of a turbine wheel and has an end forming a flat surface 6. The flat surface 6 is engaged in contact with a turbine-wheel engagement portion of the turbine wheel (turbine disk). The turbine wheel is formed by cutting out from the turbine rotor and has the turbine-wheel engagement portion engageable to the blade-fitting portion 3.

The effective blade portion 1 allows the flow direction of steam to change while the steam flows in from the front edge 1*a* towards the rear edge 1*b*, and causes the turbine wheel to rotate in response to the force generated during the change in the flow direction.

On the other hand, the cover 2 has a cover ventral-bulging section 9 and a cover dorsal-bulging section 10 that are arranged in the circumferential direction of the turbine wheel. Specifically, the cover ventral-bulging section 9 and the cover dorsal-bulging section 10 are arranged in an arrangement direction $AR_2$ of effective blade portions (i.e. the circumferential direction of the turbine wheel) and located at positions respectively corresponding to a ventral blade section 7 and a dorsal blade section 8.

The cover 2 has dimensions such that the overall width W thereof and the sum of a width $W_1$ of the cover dorsal-bulging section 10 and a width $W_2$ of the cover ventral-bulging section 9 satisfy the relationship: $W<W_1+W_2$.

The difference between the sum of the width $W_1$ of the cover dorsal-bulging section 10 and the width $W_2$ of the cover ventral-bulging section 9 and the overall width W of the cover 2 ($W_1+W_2-W$) corresponds to a cover interference amount δ generated when the cover 2 is brought into contact with neighboring covers 2 at a cover-ventral-bulging-section contact surface 11 and at a cover-dorsal-bulging-section contact surface 12. This cover interference amount 6 causes the cover 2 to be forcibly twisted.

When the cover 2 becomes twisted, a cover-contact reaction force Fc is generated at each of the cover-ventral-bulging-section contact surface 11 and the cover-dorsal-bulging-section contact surface 12 in a cover-contact-surface normal-line direction $AR_3$.

A cover-contact reaction force Fc is a factor that creates a frictional force for suppressing vibration produced in the turbine rotor blade while in operation.

Figure 2:
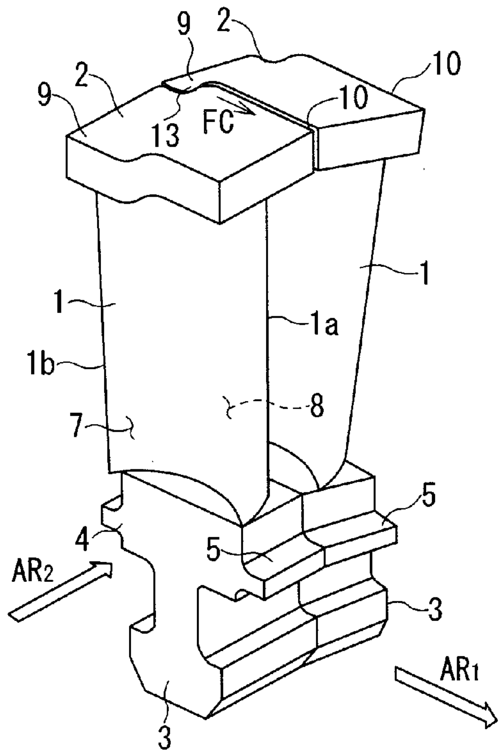
FIG. 2 is a perspective view showing an arrayed state of turbine rotor blades according to the first embodiment of the present invention.

Referring to FIG. 2, regarding turbine rotor blades according to this embodiment having the above-described structure, when the effective blade portions 1, 1 are arranged in the effective-blade-portion arrangement direction $AR_2$ (i.e. the circumferential direction of the turbine wheel), cover contact surfaces 13 of the cover ventral-bulging section 9 and the cover dorsal-bulging section 10 are brought into pressure contact with each other. This pressure contact causes twisting of the covers 2.

In this case, although the covers 2 are favorably twisted, the effective blade portions 1, 1 are rigidly movable and are thus freely rotatable unless there is something to restrain the twist, which may lead to an occurrence of so-called untwisting. Such untwisting of the covers 2 may possibly hinder the generation of cover-contact reaction forces Fc in the cover contact surfaces 13.

Figure 3:
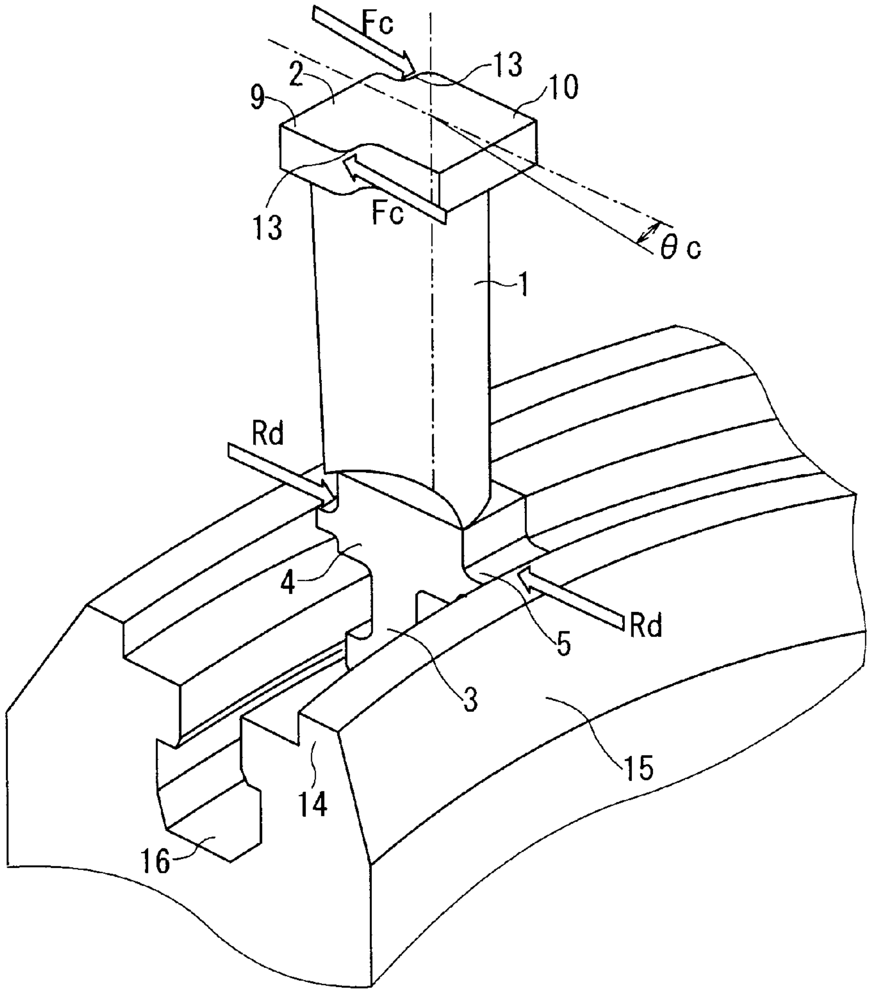
FIG. 3 is a perspective view showing an assembled state of a blade-fitting portion included in the turbine rotor blade according to the first embodiment of the present invention with respect to a turbine-wheel engagement portion.

However, as shown in FIG. 3, a turbine-wheel engagement portion 16 of a turbine wheel (turbine disk) 15 is provided with untwist restraining segments 14 that allow the anti-twist segments 5 provided in the solid (blade base) 4 of the blade-fitting portion 3 to sufficiently serve their functions when torsion is generated in the cover contact surfaces 13, for example, when a twist angle θc is generated in the cover 2. As a result, untwist-restraining-segment reaction forces Rd are generated between the untwist restraining segments 14 of the turbine-wheel engagement portion 16 and the anti-twist segments 5 of the solid 4, whereby the cover-contact reaction force Fc generated on each cover contact surface 13 can be maintained at a high level.

A mechanism for generating such cover-contact reaction forces Fc will be described in detail hereunder with reference to FIG. 4.

A twist angle θc generated in the cover 2 causes slight local elastic deformation of the cover 2 and is determined on the basis of an interference amount with respect to the neighboring covers 2 at the ventral blade section 7 side and the dorsal blade section 8 side. In other words, the twist angle θc is determined on the basis of the dimensions of the cover 2 and may be treated as a constant.

A twist angle θd of the anti-twist segments 5 is substantially determined on the basis of a rigid rotation amount of the anti-twist segments 5.

Figure 4:
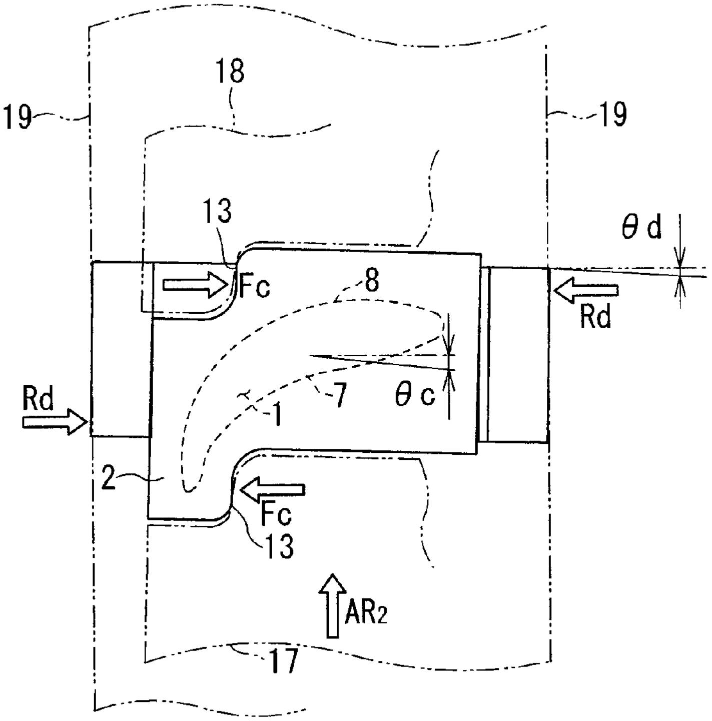
FIG. 4 is a plan view showing an assembled state of a cover included in the turbine rotor blade according to the first embodiment of the present invention.

In FIG. 4, reference numeral 17 indicated with a two-dot chain line denotes a neighboring cover at the ventral blade section side, whereas reference numeral 18 denotes a neighboring cover at the dorsal blade section side. Reference numeral 19 denotes a boundary line of the untwist restraining segments provided in the turbine-wheel engagement portion.

Figure 5:
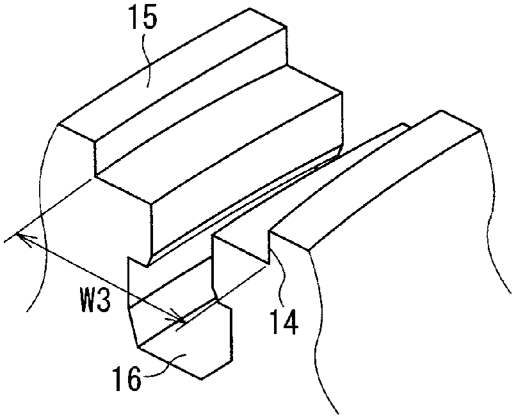
FIG. 5 is a partially cutaway perspective view of the turbine-wheel engagement portion for the turbine rotor blade according to the first embodiment of the present invention.
Figure 6:
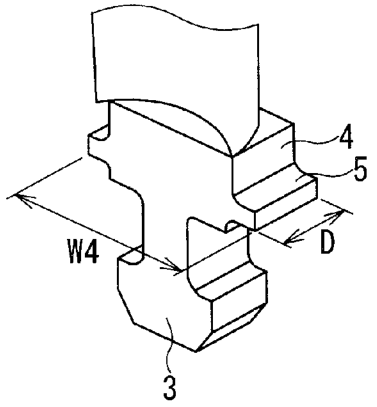
FIG. 6 is a partially cutaway perspective view of the blade-fitting portion of the turbine rotor blade according to the first embodiment of the present invention.

When the width between the untwist restraining segments 14 of the turbine-wheel engagement portion 16 is represented as $W_3$ as shown in FIG. 5 and the width between the anti-twist segments 5 of the solid 4 is represented as $W_4$ as shown in FIG. 6, since the gaps formed between the anti-twist segments 5 and the untwist restraining segments 14 at the time of assembling the turbine rotor blade may be expressed by the difference between the width $W_3$ and the width $W_4$, the rigid rotation amount of the anti-twist segments 5 is expressed as a function of a length (depth dimension) D of each anti-twist segment 5 of the solid 4.

Accordingly, the twist angle θd of the anti-twist segments 5 is expressed as a function of the difference ($W_3-W_4$) and the depth dimension D.

$$\theta d=f(W_3-W_4,D) \quad \text{[Expression 1]}$$

When the equivalent twist rigidity and the length from the anti-twist segments 5 of the solid 4 to the cover 2 are respectively represented as G and L, a cover-contact reaction force Fc generated on each cover contact surface 13 of the cover 2 is expressed as follows.

$$Fc=G\times(\theta_c-\theta_d)/L=G/L\times\{\theta_c-f(W_3-W_4,D)\} \quad \text{[Expression 2]}$$

If a contact reaction force generated on each cover contact surface 13 of the cover 2 during operation is represented as fc, since this contact reaction force fc can be equally applied to the above expression, the cover-contact reaction force fc generated on the cover 2 in operation can be expressed as follows:

$$fc=g/L\times\{\theta_c-f(W_3-W_4,D)\} \quad \text{[Expression 3]}$$

where letter g represents an equivalent twist rigidity under the temperature during operation. In the operative state, the amount of change in each of L, θc and D caused by deformation or linear expansion due to a centrifugal force is only to a small degree and is therefore considered as being equal to the value at the time of assembly.

Because the flat surface 6 of each anti-twist segment 5 provided on the solid 4 is projected in the axial direction of the turbine rotor, the width $W_3$ and the width $W_4$ vary in accordance with an expansion of the turbine wheel 15 and the turbine rotor.

Since the turbine wheel 15 and the effective blade portion 1 has only a small linear expansion difference therebetween, the cover-contact reaction forces Fc generated on the cover 2 can be considered to have the same value in the operative state and the assembly state.

Supposing that the flat surface 6 of each anti-twist segment 5 provided on the solid 4 is not projected in the axial direction of the turbine rotor, the width $W_3$ between the untwist restraining segments 14 provided in the turbine-wheel engagement portion 16 will change more significantly due to the centrifugal force in addition to thermal linear expansion occurring in the operative state. This implies that the width difference ($W_3-W_4$) between the width $W_3$ of the untwist restraining segments 14 in the turbine-wheel engagement portion 16 and the width $W_4$ of the anti-twist segments 5 in the solid 4 will considerably be much greater in comparison with that at the time of assembly.

In such case, it is not absolutely necessary for the direction of the cover contact surfaces 13 of the cover 2 with respect to a neighboring cover 2, and the projecting direction of the anti-twist segments 5 to be completely parallel to the axial direction of the turbine rotor. Since the amount of change in the circumferential direction of the turbine wheel 15 in this case is a small value expressed by a trigonometric function, a sufficient cover-contact reaction force Fc can be ensured even if there is a deviation in parallelism between the anti-twist segments 5 and the cover contact surfaces 13 within a range of 1 degree or less.

The blade-fitting portions 3, 3 may considerably serve as anti-twist segments in place of the anti-twist segments 5 as along as the neighboring blade-fitting portions 3, 3 are arranged closely in contact with each other. However, as the turbine wheel 15 increases in diameter due to the centrifugal force during operation, the distance between the neighboring blade-fitting portions 3, 3 in the circumferential direction also increases. For this reason, it is considered that there will be a larger gap between the neighboring blade-fitting portions 3, 3 in comparison with that at the time of assembly.

In such case, since the cover-contact reaction force Fc generated on each cover contact surface 13 is considered to decrease, there is low expectation for achieving the advantage of a full-circumference single-unit structure of turbine rotor blades configured by arranging the covers 2, 2 in contact with each other.

In contrast, in this embodiment, the anti-twist segments 5 are provided on the solid 4 and the untwist restraining segments 14 engageable to the anti-twist segments 5 are provided in the turbine-wheel engagement portion 16, so that even if there is a certain deviation in parallelism between the anti-twist segments 5 and the cover contact surfaces 13 of the cover 2 and its neighboring covers 2, the sufficient cover-contact reaction forces Fc can be generated on the cover contact surfaces 13. With the attainment of cover-contact reaction forces, a sufficient damping effect can be exhibited, and a full-circumference single-unit blade-array structure can be thereby achieved.

Figure 7:
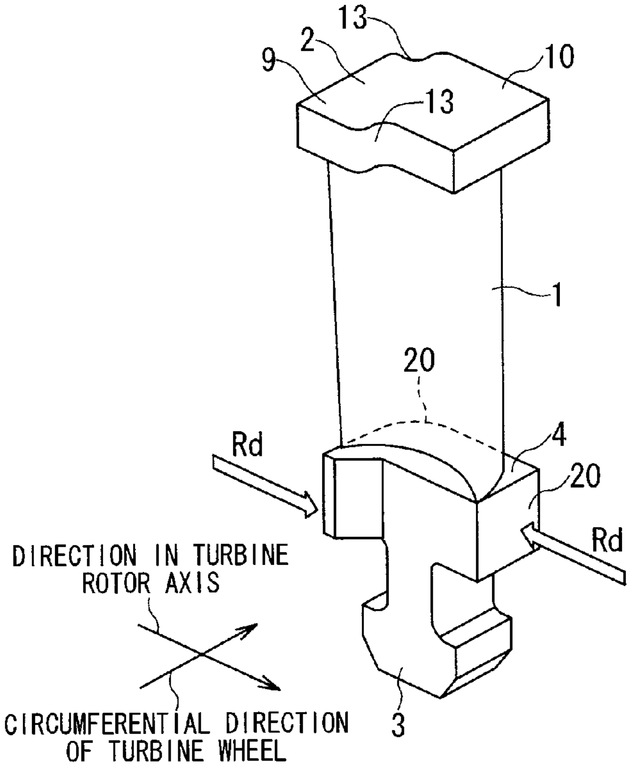
FIG. 7 is a perspective view of a turbine rotor blade according to a second embodiment of the present invention.
Figure 8:
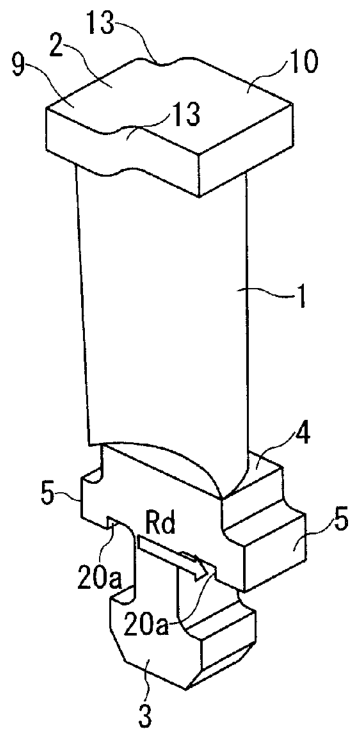
FIG. 8 is a perspective view of a turbine rotor blade according to a third embodiment of the present invention.

Although this embodiment is configured to allow sufficient cover-contact reaction forces Fc to be generated on the cover contact surfaces 13 by providing the solid 4 with the anti-twist segments 5 and by providing the turbine-wheel engagement portion 16 with the untwist restraining segments 14 engageable to the anti-twist segments 5, the embodiment is not limited to this example. For example, as shown in FIG. 7, end surfaces 20 of the solid 4 oriented in the axial direction of the turbine rotor may be strongly pressed against the untwist restraining segments 14 of the turbine-wheel engagement portion 16 shown in FIG. 5, so as to generate untwist-restraining-segment reaction forces Rd. Under the attainment of these sufficient untwist-restraining-segment reaction forces Rd, the cover-contact reaction forces Fc can be maintained at a sufficiently high level (second embodiment). Alternatively, for example, as shown in FIG. 8, inner surfaces **20*a* of the anti-twist segments 5 provided on the solid 4 may be engaged with the turbine-wheel engagement portion 16** in order to generate the untwist-restraining-segment reaction forces Rd (third embodiment).

Figure 9:
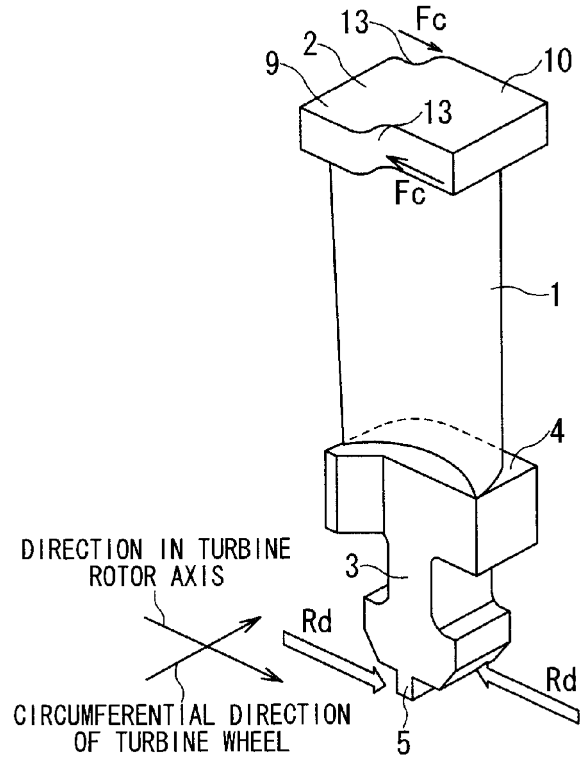
FIG. 9 is a perspective view of a turbine rotor blade according to a fourth embodiment of the present invention.

FIG. 9 is a perspective view of a turbine rotor blade according to a fourth embodiment of the present invention.

It is to be noted that like reference numerals are added to members or components corresponding to those in the first embodiment, and the duplicated redundant descriptions will be omitted herein.

The turbine rotor blade according to this fourth embodiment includes a cover 2 having a snubber structure and provided at the top of an effective blade portion 1, and a T-shaped blade-fitting portion 3 provided at the bottom of the effective blade portion 1. A bottom section of the T-shaped blade-fitting portion 3 is provided with an anti-twist segment 5 extending in the circumferential direction of the wheel. The turbine-wheel engagement portion is provided with an untwist restraining groove, not shown, engageable to this anti-twist segment 5.

Accordingly, in this embodiment, by engaging the anti-twist segment 5 provided on the T-shaped blade-fitting portion 3 to the untwist restraining groove in the turbine-wheel engagement portion, an untwist-restraining-segment reaction force Rd can be generated between the anti-twist segment 5 and the untwist restraining groove. Based on this untwist-restraining-segment reaction force Rd, the cover-contact reaction forces Fc can be reliably generated on the cover contact surfaces 13. Consequently, under the attainment of the cover-contact reaction forces Fc, anti-twist prevention can be achieved for the cover 2, thus exhibiting a high damping effect.

Figure 10:
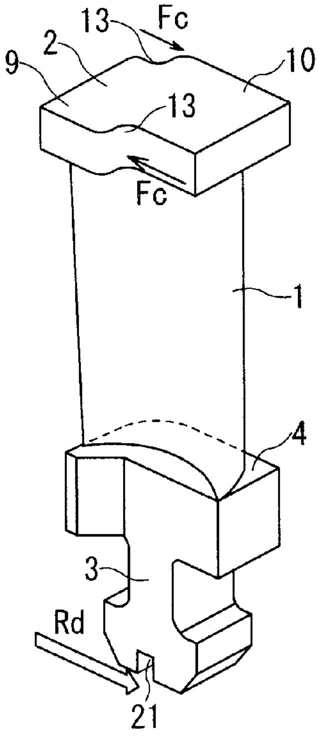
FIG. 10 is a perspective view of a turbine rotor blade according to a fifth embodiment of the present invention.

Although this embodiment is configured such that the anti-twist segment 5 is provided at the bottom section of the T-shaped blade-fitting portion 3 and that the untwist restraining groove engageable to this anti-twist segment 5 is provided in the turbine-wheel engagement portion, the embodiment is not limited to this example. For example, as shown in FIG. 10, an untwist restraining groove 21 having a recessed shape may be provided at the bottom section of the T-shaped blade-fitting portion 3, and an anti-twist segment engageable to this recessed untwist restraining groove 21 may be provided in the turbine-wheel engagement portion 16 (fifth embodiment). In this case, an untwist-restraining-segment reaction force Rd can be generated between the untwist restraining groove 21 and the anti-twist segment so that the cover-contact reaction forces Fc can be ensured.

Figure 11:
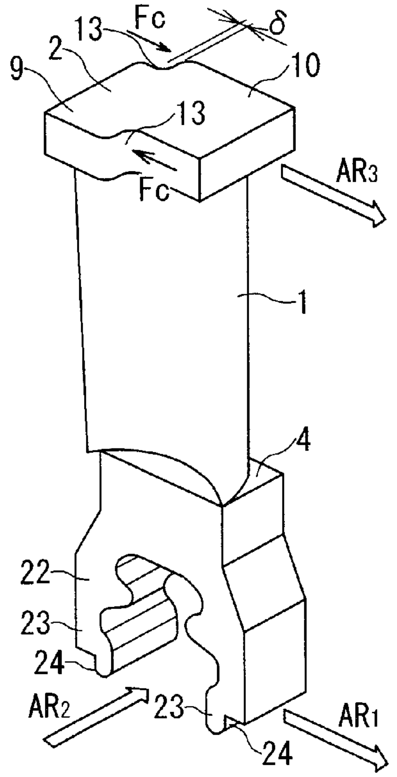
FIG. 11 is a perspective view of a turbine rotor blade according to a sixth embodiment of the present invention.

FIG. 11 is a perspective view of a turbine rotor blade according to a sixth embodiment of the present invention.

It is to be noted that like reference numerals are added to members or components corresponding to those in the first embodiment, and duplicated redundant descriptions will be omitted herein.

The turbine rotor blade according to this sixth embodiment includes a cover 2 having a snubber structure and provided at the top of an effective blade portion 1, and an outside-tab-table-shaped (saddle shaped) blade-fitting portion 22 at the bottom of the effective blade portion 1. Saddle-shaped leg segments 23 of the outside-tab-table-shaped blade-fitting portion 22 are provided with anti-twist grooves 24 defined by cutouts having a stepped shape and extending in the circumferential direction of the wheel. The turbine-wheel engagement portion is provided with untwist restraining segments, not shown, that are engageable to these anti-twist grooves 24 defined by step-like cutouts.

As in the first embodiment, the sum of the width of the cover dorsal-bulging section 10 and the width of the cover ventral-bulging section 9 is set greater than the overall width of the cover 2 so that the cover 2 can be twisted in accordance with a cover interference amount δ generated when the cover 2 is brought into contact with neighboring covers 2.

Figure 12:
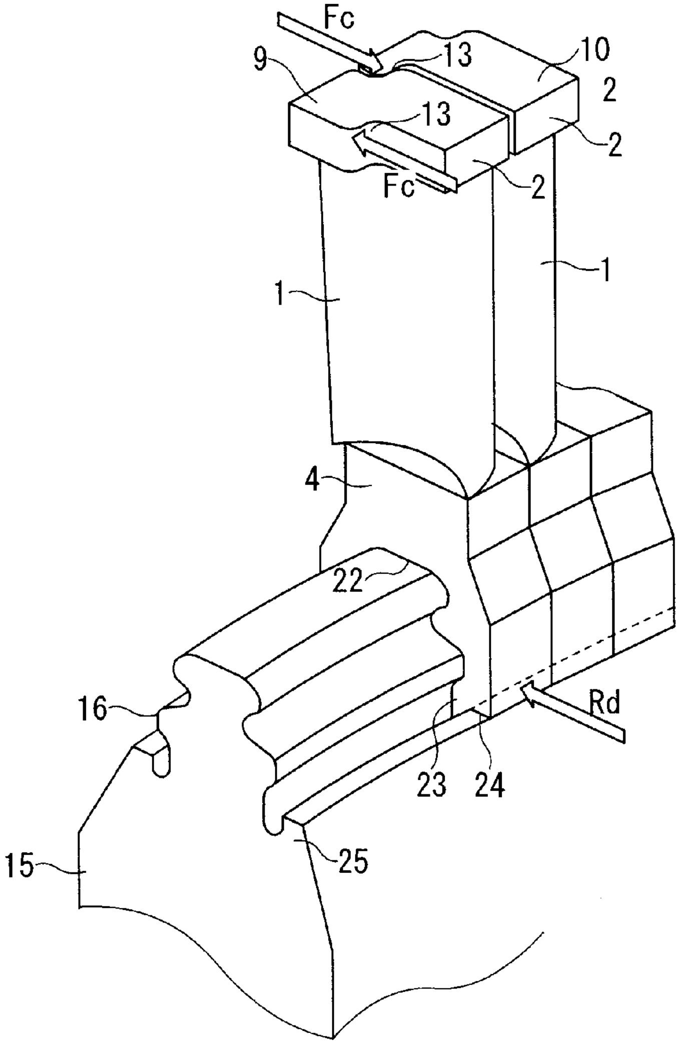
FIG. 12 is a perspective view showing an assembled state of blade-fitting portions included in the turbine rotor blades according to the sixth embodiment of the present invention with respect to a turbine-wheel engagement portion.

Referring to FIG. 12, regarding the turbine rotor blade having the above-described structure, when the effective blade portion 1 equipped with the outside-tab-table-shaped blade-fitting portion 22 is fitted to the turbine-wheel engagement portion 16 of the turbine wheel 15, the untwist-restraining-segment reaction forces Rd can be generated between the anti-twist grooves 24 provided in the saddle-shaped leg segments 23 of the outside-tab-table-shaped blade-fitting portion 22 and untwist restraining segments 25 provided in the turbine-wheel engagement portion 16.

According to this embodiment, the generation of the untwist-restraining-segment reaction forces Rd allows the sufficient cover-contact reaction forces Fc to be generated on the cover contact surfaces 13, thereby exhibiting a sufficient damping effect.

Figure 13:
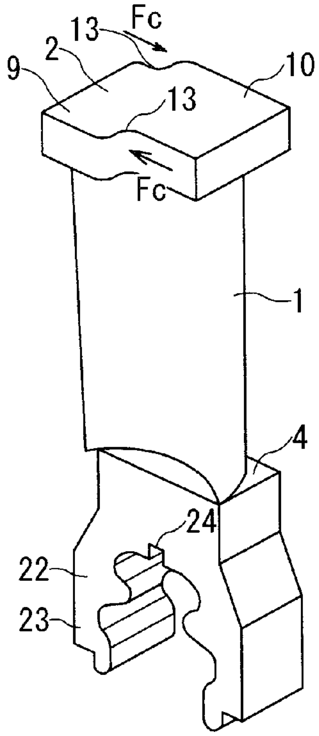
FIG. 13 is a perspective view of a turbine rotor blade according to a seventh embodiment of the present invention.

FIG. 13 is a perspective view of a turbine rotor blade according to a seventh embodiment of the present invention.

It is to be noted that like reference numerals are added to members or components corresponding to those in the first embodiment, and the duplicated redundant descriptions will be omitted herein.

The turbine rotor blade according to this embodiment includes a cover 2 having a snubber structure and provided at the top of the effective blade portion 1, and the outside-tab-table-shaped (saddle shaped) blade-fitting portion 22 at the bottom of the effective blade portion 1. An anti-twist groove 24 having a recessed shape is provided at the base of saddle-shaped leg segments 23 of the outside-tab-table-shaped blade-fitting portion 22 and extends in the circumferential direction of the wheel. The turbine-wheel engagement portion is provided with an untwist restraining segment, not shown, that is engageable to this anti-twist groove 24.

As in the first embodiment, the sum of the width of the cover dorsal-bulging section 10 and the width of the cover ventral-bulging section 9 is set greater than the overall width of the cover 2 so that the cover 2 can be twisted in accordance with a cover interference amount δ.

This embodiment ensures that cover-contact reaction forces Fc are reliably generated on the cover contact surfaces 13 as in the fourth embodiment. Under the attainment of these cover-contact reaction forces Fc, the cover 2 can be prevented from being untwisted, thereby exhibiting a high damping effect.

Figure 14:
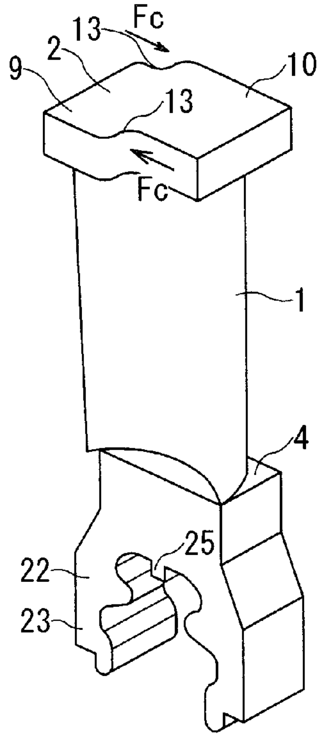
FIG. 14 is a perspective view of a turbine rotor blade according to an eighth embodiment of the present invention.

Although this embodiment is configured such that the recessed anti-twist groove 24 is provided at the base of the saddle-shaped leg segments 23 of the outside-tab-table-shaped blade-fitting portion 22 and that the untwist restraining segment engageable to this anti-twist groove 24 is provided in the turbine-wheel engagement portion, the embodiment is not limited to this example. For example, as shown in FIG. 14, an untwist restraining segment 25 may be provided at the base of the saddle-shaped leg segments 23 of the outside-tab-table-shaped blade-fitting portion 22, and a recessed anti-twist groove engageable to this untwist restraining segment 25 may be provided in the turbine-wheel engagement portion 16.

A turbine rotor according to another embodiment of the present invention is directed to a turbine rotor that is integrally provided with a turbine wheel 15 to which the turbine rotor blades according to each of the above-mentioned respective embodiments are fittable. In this turbine rotor, the bottom section of the turbine-wheel engagement portion is provided with any one of untwist restraining segments engageable to the anti-twist segments 5 according to one of the above-mentioned embodiments, the untwist restraining groove engageable to the anti-twist segment, and the untwist restraining segment engageable to the untwist restraining groove.

Figure 15:
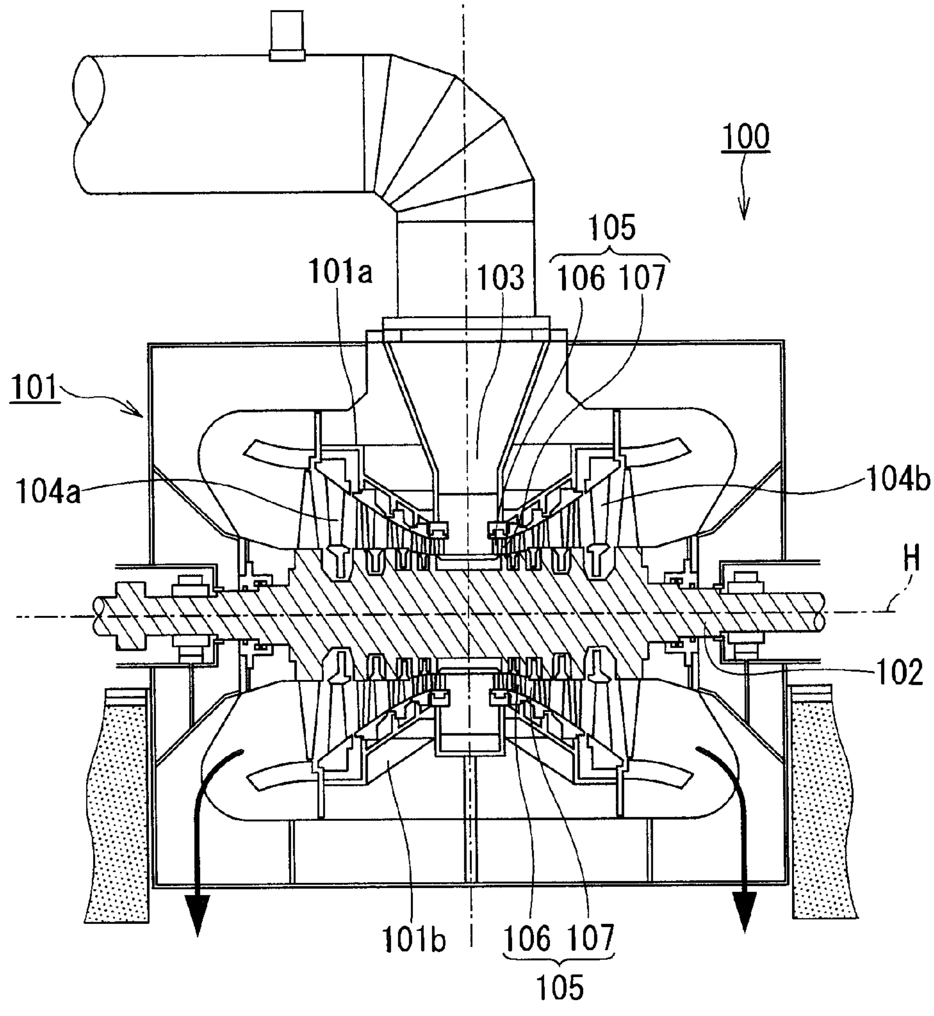
FIG. 15 is a longitudinal sectional view showing a general structure of a steam turbine to which the present invention is applied.
Figure 16:
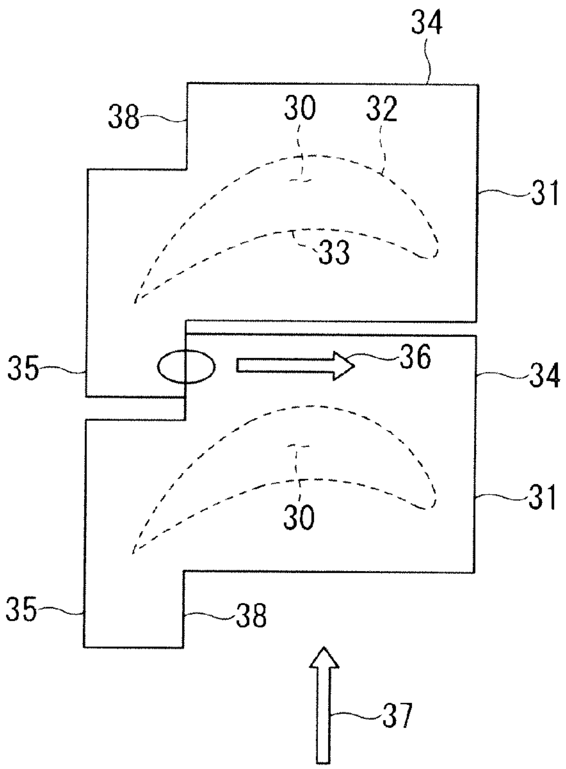
PRIOR ART FIG. 16
FIG. 16 is a plan view showing an assembled state of covers in turbine rotor blades of related art.

FIG. 15 is a longitudinal sectional view showing a general structure of a steam turbine to which the present invention is applied.

In FIG. 15, a steam turbine 100 has a dual-structure turbine casing 101 constituted by inner and outer casings. The inner casing is constituted by upper and lower casing components 101*a* and 101*b* that are separable from each other. The turbine casing 101 accommodates a turbine rotor 102 that extends along a central cross-sectional line H in a direction crosswise to a steam entrance section. The turbine rotor 102 and the upper and lower casing components 101*a* and 101*b* have steam channels 104 (104*a* and 104*b*) formed therebetween, such that the steam introduced into the steam turbine 100 flows separately in the lateral direction.

Each steam channel is provided with a plurality of turbine stages 105. Each stage is equipped with a nozzle (stator blade) 106 provided in the inner casing and a rotor blade 107 fitted to the turbine rotor 102 provided with a turbine wheel. The steam turbine 100 according to the present invention can be equipped with any of the turbine rotor blades according to the above-mentioned respective embodiments and turbine wheels in a variety of combinations thereof.

The invention claimed is:

1. A turbine rotor blade comprising a cover provided at a blade head of an effective blade portion and a blade-fitting portion provided at a blade base of the effective blade portion, the blade-fitting portion being fitted to a turbine-wheel engagement portion provided in a turbine rotor via a solid portion, the turbine rotor blade being a portion of a blade unit structure formed by arranging the cover and a neighboring cover in contact with each other, wherein the cover has a cover ventral-bulging section that bulges in a circumferential direction of the turbine rotor from one side of the cover located on a ventral blade side, and has a cover dorsal-bulging section that bulges in the circumferential direction of the turbine rotor from another side of the cover located on a dorsal blade side, the bulging sections being positioned in a point symmetrical arrangement with each other as viewed from the blade head, wherein a sum of a width of the cover ventral-bulging section in an axial direction of the turbine rotor and a width of the cover dorsal-bulging section in the axial direction of the turbine rotor is greater than a width of the cover in the axial direction of the turbine rotor, and wherein the solid portion is provided with an anti-twist segment projecting in the axial direction of the turbine rotor and extending in the circumferential direction of the turbine rotor.

2. The turbine rotor blade according to claim 1, wherein the anti-twist segment provided in the solid portion and a cover contact surface where the cover ventral-bulging section and the cover dorsal-bulging section are in contact with each other has a deviation in parallelism set within a range of 1 degree or less.

3. A turbine rotor integrally provided with a turbine wheel to which the turbine rotor blade according to claim 2 is fitted, wherein a bottom section of the turbine-wheel engagement portion is provided with an untwist restraining segment engageable to the anti-twist segment.

4. A steam turbine comprising a combination of the turbine rotor blade according to claim 2, and the turbine rotor according to claim 3.

5. The turbine rotor blade according to claim 1, wherein the blade-fitting portion has a T-shaped structure.

6. A turbine rotor integrally provided with a turbine wheel to which the turbine rotor blade according to claim 1 is fitted, wherein a bottom section of the turbine-wheel engagement portion is provided with an untwist restraining segment engageable to the anti-twist segment.

7. A steam turbine comprising a combination of the turbine rotor blade according to claim 1, and the turbine rotor according to claim 6.

8. A turbine rotor blade comprising a cover provided at a blade head of an effective blade portion and a blade-fitting portion provided at a blade base of the effective blade portion, the blade-fitting portion being fitted to a turbine-wheel engagement portion provided in a turbine rotor via a solid portion, the turbine rotor blade being a portion of a blade unit structure formed by arranging the cover and a neighboring cover in contact with each other, wherein the cover has a cover ventral-bulging section that bulges in a circumferential direction of the turbine rotor from one side of the cover located on a ventral blade side, and has a cover dorsal-bulging section that bulges in the circumferential direction of the turbine rotor from another side of the cover located on a dorsal blade side, the bulging sections being positioned in a point symmetrical arrangement with each other as viewed from the blade head, wherein a sum of a width of the cover ventral-bulging section in an axial direction of the turbine rotor and a width of the cover dorsal-bulging section in the axial direction of the turbine rotor is greater than a width of the cover in the axial direction of the turbine rotor, and wherein a bottom section of the blade-fitting portion is provided with an anti-twist segment projecting in a lengthwise direction of the blade and extending in the circumferential direction of the turbine rotor.

9. The turbine rotor blade according to claim 8, wherein the blade-fitting portion has a T-shaped structure.

10. A turbine rotor integrally provided with a turbine wheel to which the turbine rotor blade according to claim 8 is fitted, wherein a bottom section of the turbine-wheel engagement portion is provided with an untwist restraining segment engageable to the anti-untwist segment.

11. A steam turbine comprising a combination of the turbine rotor blade according to claim 8, and the turbine rotor according to claim 10.

12. A turbine rotor blade comprising a cover provided at a blade head of an effective blade portion and a blade-fitting portion provided at a blade base of the effective blade portion, the blade-fitting portion being fitted to a turbine-wheel engagement portion provided in a turbine rotor via a solid portion, the turbine rotor blade being a portion of a blade unit structure formed by arranging the cover and a neighboring cover in contact with each other, wherein the cover has a cover ventral-bulging section that bulges in a circumferential direction of the turbine rotor from one side of the cover located on a ventral blade side, and has a cover dorsal-bulging section that bulges in the circumferential direction of the turbine rotor from another side of the cover located on a dorsal blade side, the bulging sections being positioned in a point symmetrical arrangement with each other as viewed from the blade head, wherein a sum of a width of the cover ventral-bulging section in an axial direction of the turbine rotor and a width of the cover dorsal-bulging section in the axial direction of the turbine rotor is greater than a width of the cover in the axial direction of the turbine rotor, and wherein a bottom section of the blade-fitting portion is provided with an untwist restraining groove extending in the circumferential direction of the turbine rotor.

13. The turbine rotor blade according to claim 12, wherein the blade-fitting portion has a T-shaped structure.

14. A turbine rotor integrally provided with a turbine wheel to which the turbine rotor blade according to claim 12 is fitted, wherein a bottom section of the turbine-wheel engagement portion is provided with an untwist restraining segment engageable to the anti-twist segment.

15. A steam turbine comprising a combination of the turbine rotor blade according to claim 12, and the turbine rotor according to claim 14.

* * * * *